US011395360B2

United States Patent
Shi et al.

(10) Patent No.: US 11,395,360 B2
(45) Date of Patent: Jul. 19, 2022

(54) SUSTAINING LONG TERM EVOLUTION TRAFFIC IN POWER LIMITED DUAL CONNECTIVITY SCENARIOS

(71) Applicant: QUALCOMM Incorporated, San Diego, CA (US)

(72) Inventors: Yongsheng Shi, San Diego, CA (US); Kirankumar Bhoja Anchan, San Diego, CA (US); Shanshan Wang, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 16/667,701

(22) Filed: Oct. 29, 2019

(65) Prior Publication Data

US 2020/0137819 A1 Apr. 30, 2020

Related U.S. Application Data

(60) Provisional application No. 62/753,610, filed on Oct. 31, 2018.

(51) Int. Cl.
*H04W 76/16* (2018.01)
*H04W 52/36* (2009.01)
(Continued)

(52) U.S. Cl.
CPC .......... *H04W 76/16* (2018.02); *H04W 24/10* (2013.01); *H04W 52/367* (2013.01); *H04W 76/19* (2018.02); *H04W 88/06* (2013.01)

(58) Field of Classification Search
None
See application file for complete search history.

(56) References Cited

U.S. PATENT DOCUMENTS

2017/0013565 A1* 1/2017 Pelletier ............... H04W 52/365
2018/0020380 A1* 1/2018 Wang ............... H04W 36/00837
(Continued)

FOREIGN PATENT DOCUMENTS

WO 2018128572 A1 7/2018

OTHER PUBLICATIONS

International Search Report and Written Opinion—PCT/US2019/058805—ISA/EPO—dated Feb. 10, 2020.
(Continued)

*Primary Examiner* — Saumit Shah
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine that the UE is in an active communication session using a first radio access technology (RAT), wherein the UE is operating in a dual connectivity mode that uses a master cell group for the first RAT and a secondary cell group for a second RAT; determine that the UE is configured with a maximum transmit power, for the first RAT in the dual connectivity mode, that is less than a maximum transmit power threshold; determine that at least one of a power headroom (PHR) value or an estimated uplink block error rate (BLER) satisfies a condition; and transmit an indication that the secondary cell group has failed based at least in part on those determinations. Numerous other aspects are provided.

30 Claims, 6 Drawing Sheets

(51) Int. Cl.
*H04W 76/19* (2018.01)
*H04W 24/10* (2009.01)
*H04W 88/06* (2009.01)

(56) References Cited

U.S. PATENT DOCUMENTS

| | | | |
|---|---|---|---|
| 2019/0215756 A1* | 7/2019 | Park | H04W 52/06 |
| 2019/0289510 A1* | 9/2019 | Rugeland | H04W 36/0069 |
| 2020/0404517 A1* | 12/2020 | Jiang | H04W 4/029 |
| 2021/0204227 A1* | 7/2021 | Bergljung | H04W 52/34 |

OTHER PUBLICATIONS

Qualcomm Incorporated: "MCG/SCG Failure Handling in MR-DC," 3GPP Draft, 3GPP TSG-RAN WG2 Meeting #103, R2-1812748, MCG-SCG Failure Handling in MR-DC, 3rd Generation Partnership Project (3GPP), Mobile Competence Centre, 650, Route Des Lucioles, F-06921, Sophia-Antipolis Cedex, France, vol. RAN WG2, No. Gothenburg, Sweden, Aug. 20, 2018-Aug. 24, 2018, Aug. 10, 2018 (Aug. 10, 2018), XP051522342, 2 pages, Retrieved from the URL: https://www.3gpp.org/ftp/tsg_ran/WG2_RL2/TSGR2_103/Docs/R2-1812748.zip.

Rapoorteur (ZTE Corporation): "Agreements for MR-DC With 5GC," 3GPP Draft, 3GPP TSG-RAN WG2 Meeting #103bis, R2-1814894, 37.340CR0073—Agreements for MR-DC@5GC, 3rd Generation Partnership Project (3GPP), Mobile Competence Centre, 650, Route Des Lucioles, F-06921, Sophia-Antipolis Cedex, France, vol. RAN WG2, No. Chengdu, China, Sep. 8, 2018-Sep. 12, 2018, Sep. 28, 2018 (Sep. 28, 2018), XP051524274, 4 pages, Retrieved from the URL: https://www.3gpp.org/ftp/tsg_ran/WG2_RL2/TSGR2_103bis/Docs/R2-1814894.zip.

* cited by examiner

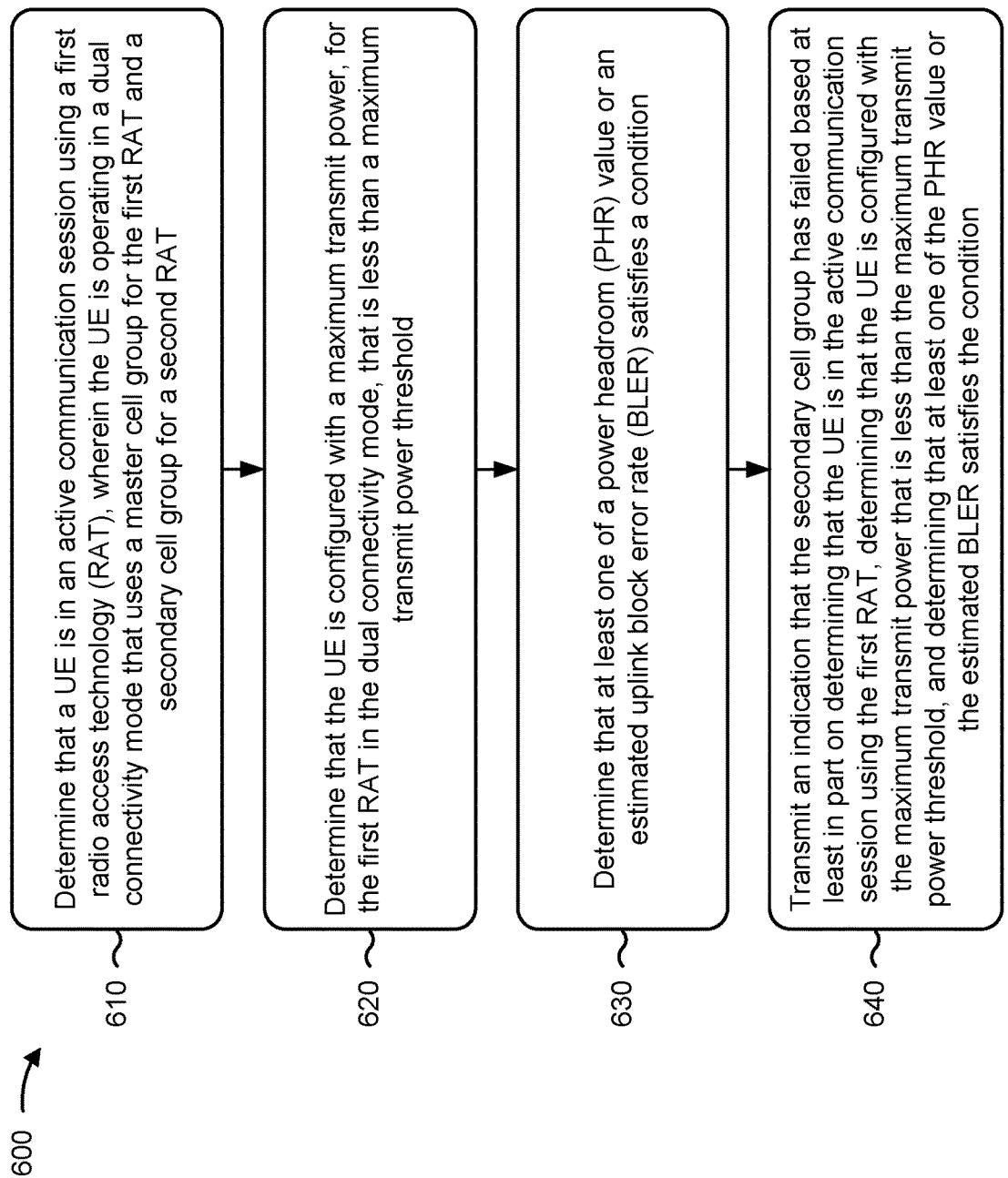

SUSTAINING LONG TERM EVOLUTION TRAFFIC IN POWER LIMITED DUAL CONNECTIVITY SCENARIOS

CROSS-REFERENCE TO RELATED APPLICATION

This application claims priority to U.S. Provisional Patent Application No. 62/753,610, filed on Oct. 31, 2018, entitled "SUSTAINING LONG TERM EVOLUTION TRAFFIC IN POWER LIMITED DUAL CONNECTIVITY SCENARIOS," which is hereby expressly incorporated by reference herein.

FIELD OF THE DISCLOSURE

Aspects of the present disclosure generally relate to wireless communication and to techniques and apparatuses for sustaining Long Term Evolution (LTE) traffic in power limited dual connectivity scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that the UE is in an active communication session using a first radio access technology (RAT), wherein the UE is operating in a dual connectivity mode that uses a master cell group for the first RAT and a secondary cell group for a second RAT; determining that the UE is configured with a maximum transmit power, for the first RAT in the dual connectivity mode, that is less than a maximum transmit power threshold; determining that at least one of a power headroom (PHR) value or an estimated uplink block error rate (BLER) satisfies a condition; and transmitting an indication that the secondary cell group has failed based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

In some aspects, a UE for wireless communication may include memory and one or more processors operatively coupled to the memory. The memory and the one or more processors may be configured to determine that the UE is in an active communication session using a first radio access technology (RAT), wherein the UE is operating in a dual connectivity mode that uses a master cell group for the first RAT and a secondary cell group for a second RAT; determine that the UE is configured with a maximum transmit power, for the first RAT in the dual connectivity mode, that is less than a maximum transmit power threshold; determine that at least one of a power headroom (PHR) value or an estimated uplink block error rate (BLER) satisfies a condition; and transmit an indication that the secondary cell group has failed based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

In some aspects, a non-transitory computer-readable medium may store one or more instructions for wireless communication. The one or more instructions, when executed by one or more processors of a UE, may cause the one or more processors to determine that the UE is in an active communication session using a first radio access technology (RAT), wherein the UE is operating in a dual connectivity mode that uses a master cell group for the first RAT and a secondary cell group for a second RAT; determine that the UE is configured with a maximum transmit power, for the first RAT in the dual connectivity mode, that is less than a maximum transmit power threshold; determine that at least one of a power headroom (PHR) value or an estimated uplink block error rate (BLER) satisfies a condition; and transmit an indication that the secondary cell group has failed based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

In some aspects, an apparatus for wireless communication may include means for determining that the apparatus is in an active communication session using a first radio access technology (RAT), wherein the apparatus is operating in a dual connectivity mode that uses a master cell group for the first RAT and a secondary cell group for a second RAT; means for determining that the apparatus is configured with a maximum transmit power, for the first RAT in the dual connectivity mode, that is less than a maximum transmit power threshold; means for determining that at least one of a power headroom (PHR) value or an estimated uplink block error rate (BLER) satisfies a condition; and means for transmitting an indication that the secondary cell group has failed based at least in part on determining that the apparatus is in the active communication session using the first RAT, determining that the apparatus is configured with the maximum transmit power that is less than the maximum transmit power threshold, and determining that at least one of the PHR value or the estimated BLER satisfies the condition.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
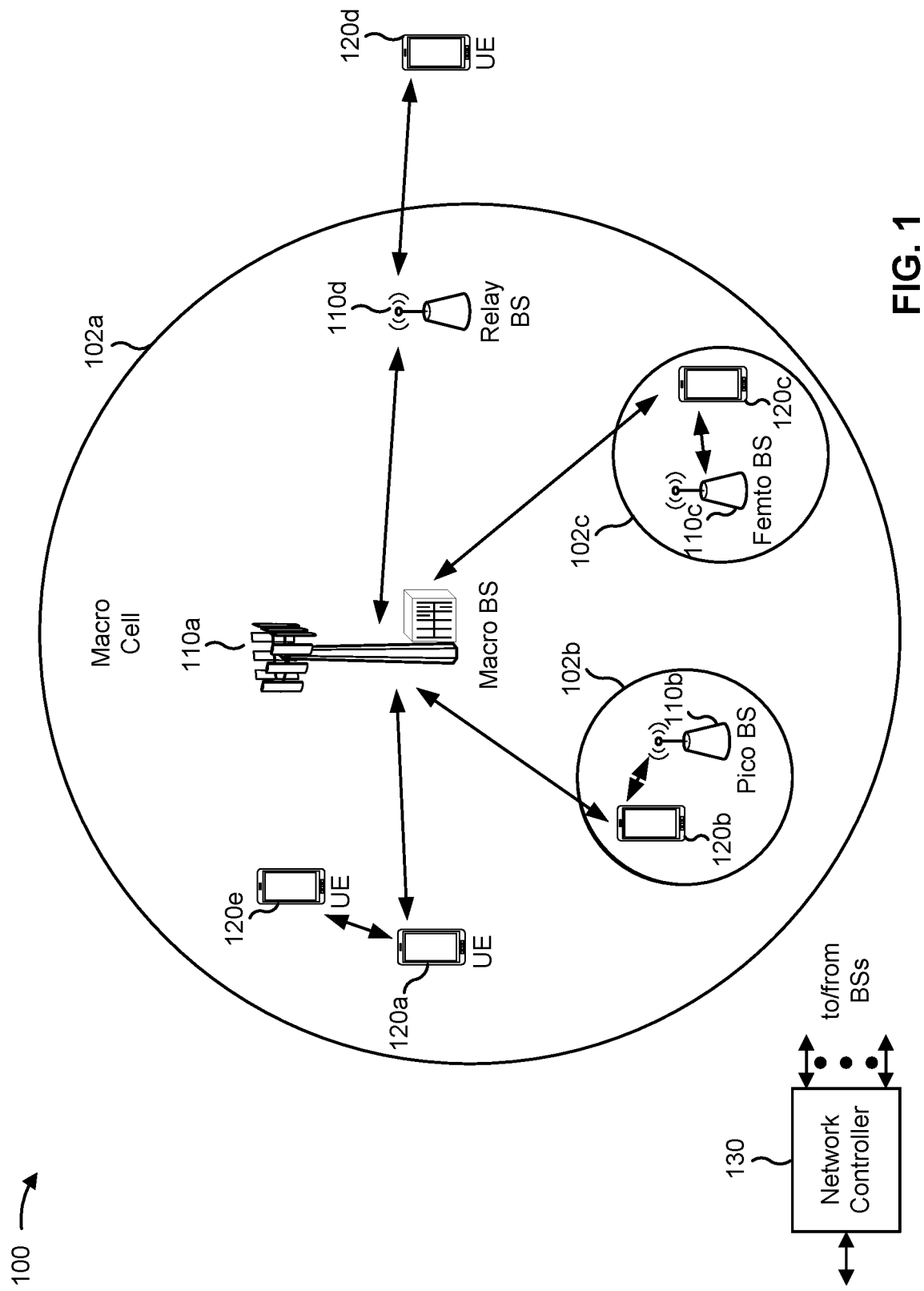
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
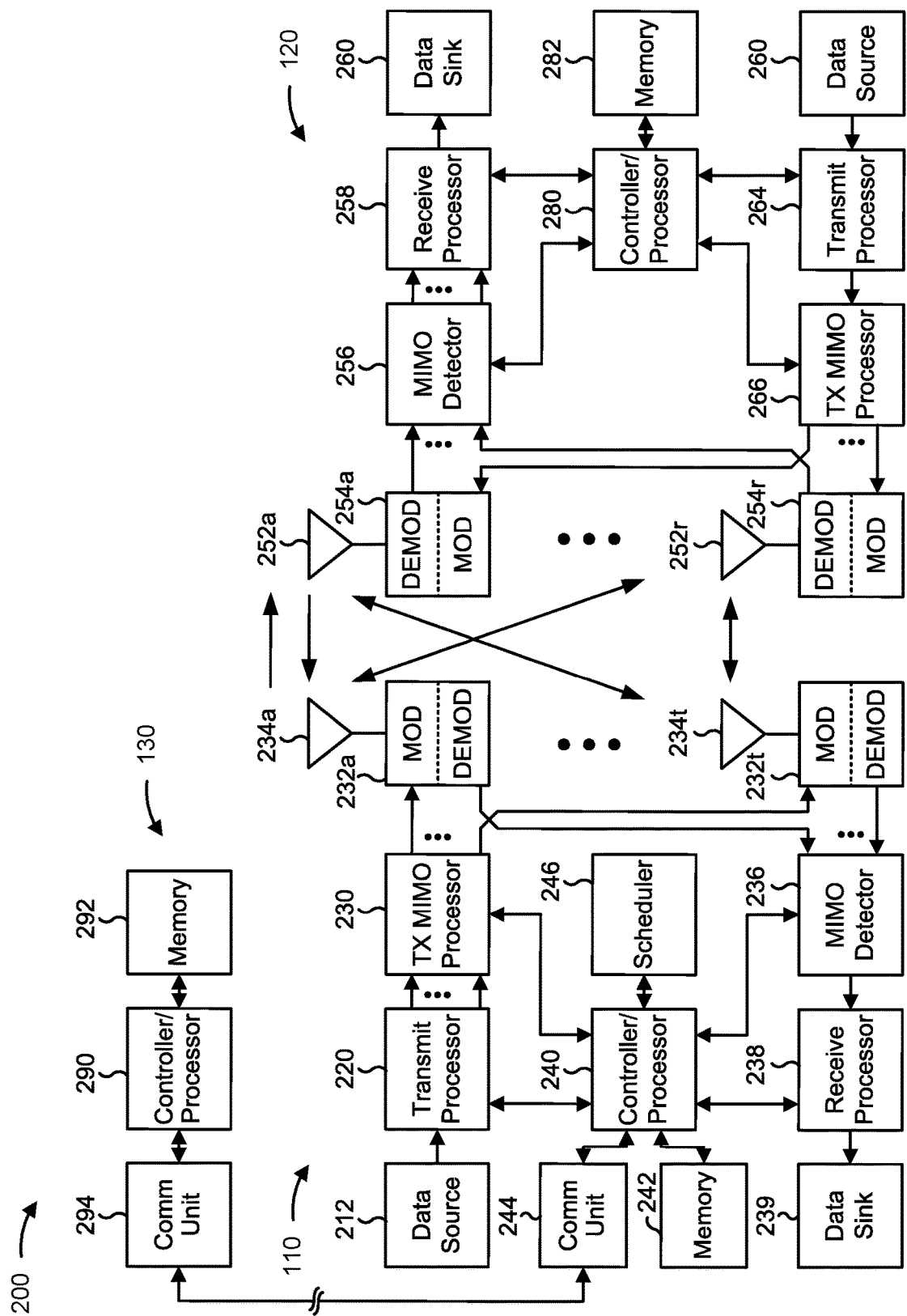
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sustaining traffic of a first radio access technology (RAT) in power limited dual connectivity scenarios, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that the UE 120 is in an active communication session using a first radio access technology (RAT), wherein the UE 120 is operating in a dual connectivity mode that uses a master cell group for the first RAT and a secondary cell group for a second RAT; means for determining that the UE 120 is configured with a maximum transmit power, for the first RAT in the dual connectivity mode, that is less than a maximum transmit power threshold; means for determining that at least one of a power headroom (PHR) value or an estimated uplink block error rate (BLER) satisfies a condition; means for transmitting an indication that the secondary cell group has failed based at least in part on determining that the UE 120 is in the active communication session using the first RAT, determining that the UE 120 is configured with the maximum transmit power that is less than the maximum transmit power threshold, and determining that at least one of the PHR value or the estimated BLER satisfies the condition; and/or the like. In some aspects, such means may include one or more components of UE 120 described in connection with FIG. 2.

As indicated above, FIG. 2 is provided merely as an example. Other examples may differ from what was described with regard to FIG. 2.

Figure 3:
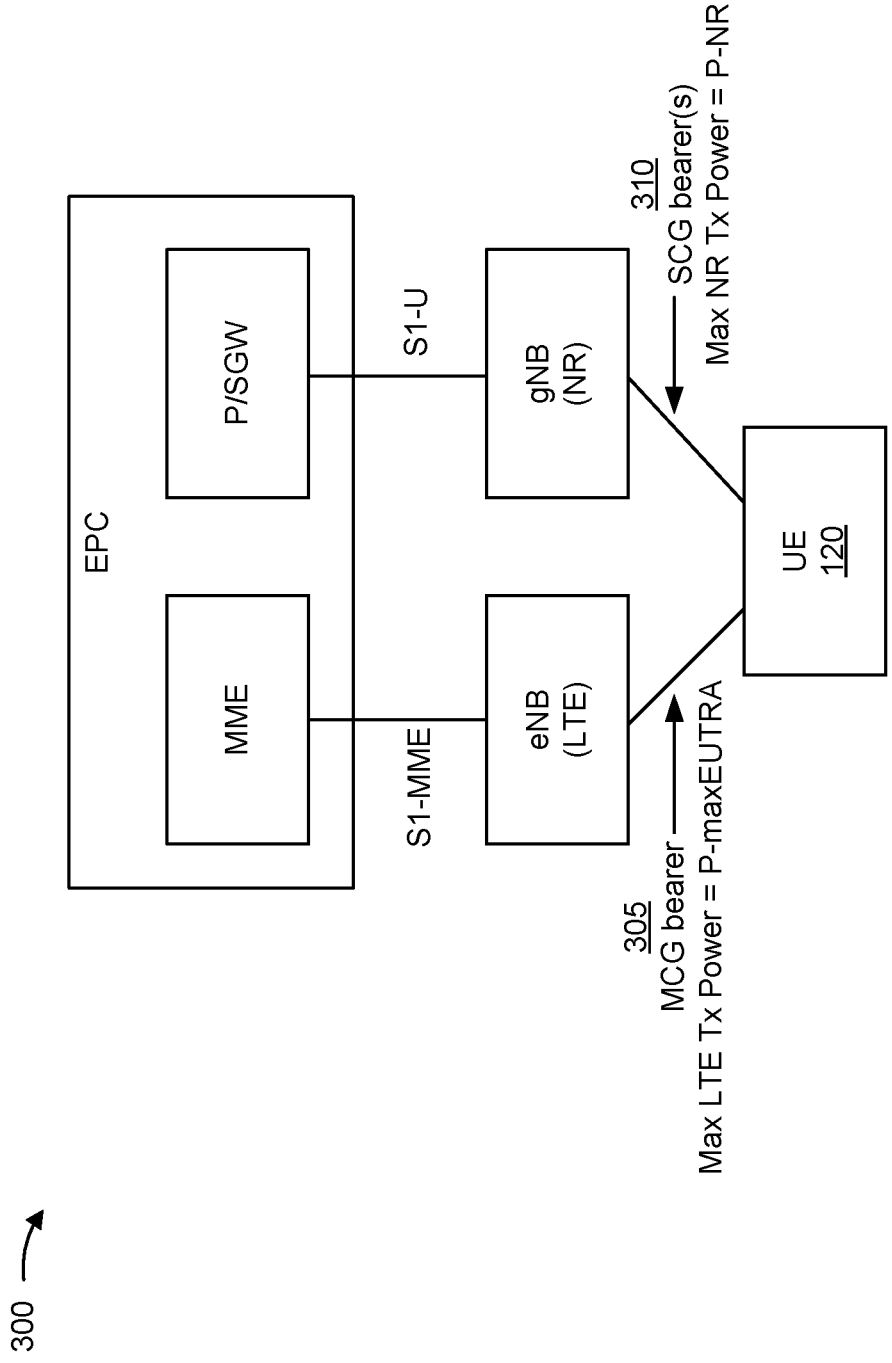
FIG. 3 is a diagram illustrating an example New Radio non-standalone (NSA) architecture, in accordance with various aspects of the present disclosure.

FIG. 3 is a diagram illustrating an example New Radio non-standalone (NSA) architecture, in accordance with various aspects of the present disclosure.

As shown in FIG. 3, in a New Radio (NR) or 5G NSA mode, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network (PDN) gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the master cell group, and may communicate with the gNB via the secondary cell group. In some aspects, the master cell group may anchor a network connection between the UE 120 and the 4G/LTE core network (e.g., for mobility, coverage, control plane information, and/or the like), and the secondary cell group may be added as additional carriers to increase throughput (e.g., for data traffic, user plane information, and/or the like). In some aspects, the gNB and the eNB may not transfer user plane information between one another. This NSA architecture may be referred to as Option 3a.

In some aspects, the 5G NSA mode may be referred to as an Evolved Universal Mobile Telecommunications System Terrestrial Radio Access (E-UTRA)-New Radio (NR) dual connectivity (ENDC) mode. In some aspects, a UE 120 operating in the ENDC mode, having dual connectivity with an LTE base station 110 (e.g., an eNB) and an NR base station 110 (e.g., a gNB), may be referred to as an ENDC UE.

When a UE 120 is operating in the ENDC mode, a maximum transmit power of the UE 120 may be split between LTE communications on the master cell group and NR communications on the secondary cell group. For example, as shown by reference number 305, the network (e.g., a base station 110, the eNB, the gNB, and/or the like) may indicate a maximum transmit power for LTE communications on the master cell group (MCG) for the ENDC mode, shown as P-maxEUTRA. Furthermore, as shown by reference number 310, the network (e.g., a base station 110, the eNB, the gNB, and/or the like) may indicate a maximum transmit power for NR communications on the secondary cell group (SCG) for the ENDC mode, shown as P-NR (e.g., P-maxNR). Because the UE 120 may transmit on the MCG and the SCG at the same time, the (logarithmically) combined values of P-maxEUTRA and P-NR cannot exceed an overall maximum transmit power for the UE 120 (e.g., P-max and/or the like). For example, if the UE 120 has a power class with a maximum transmit power of 23 decibel-milliwatts (dBm), then the combined values of P-maxEUTRA and P-NR must be less than or equal to 23 dBm.

Due to the above requirement, the UE 120 may be configured with a maximum transmit power for LTE communications for the ENDC mode (P-maxEUTRA) that is less than a maximum transmit power for LTE communications when not operating in the ENDC mode (e.g., that is less than a maximum transmit power of a power class of the UE, 23 dBm, 26 dBm, P-max, and/or the like). As a result, some LTE communications may be dropped, especially in scenarios where the UE 120 is operating with poor network conditions (e.g., indoors, at a cell edge, and/or the like). For example, when the UE 120 is operating in the ENDC mode, some high priority LTE communication sessions, such as a voice call (e.g., a Voice over LTE (VoLTE) call), may use LTE and may be carried via the master cell group (e.g., due to the SCG lacking the capability to handle this traffic, the SCG having lower priority, and/or the like). Due to the maximum transmit power for those LTE communication sessions being lower in the ENDC mode, some of those LTE communication sessions may be dropped. Some techniques and apparatuses described herein assist with sustaining LTE communication sessions when the UE 120 is operating in the ENDC mode. Additional details are described below.

Although some operations are described herein in connection with an ENDC mode, these operations may be performed in connection with any type of dual connectivity mode, referred to generally as multi-radio dual connectivity (MRDC).

As indicated above, FIG. 3 is provided as an example. Other examples may differ from what was described with respect to FIG. 3.

Figure 4:
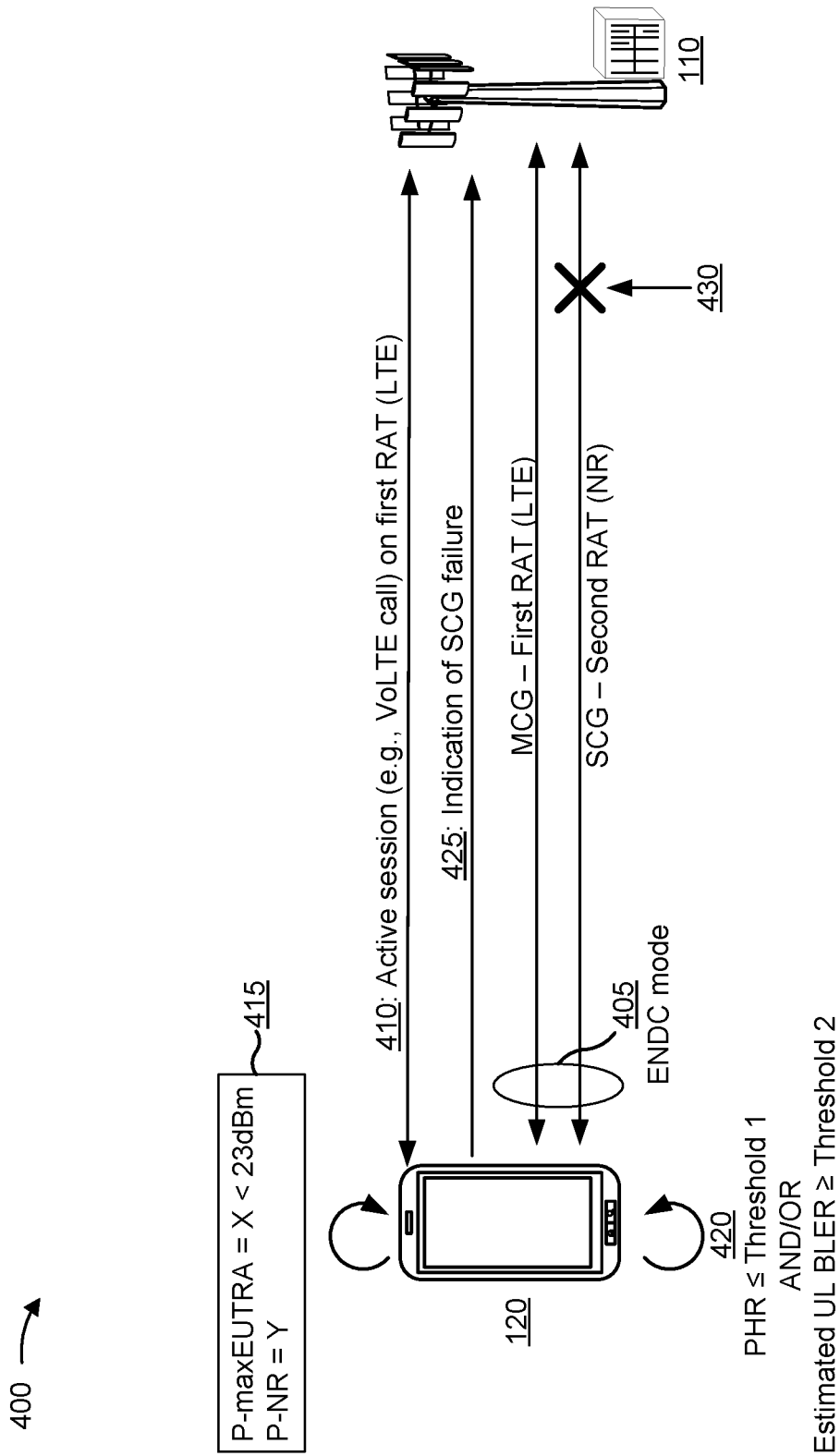
FIGS. 4 and 5 are diagrams illustrating examples of sustaining traffic of a first radio access technology (RAT) in power limited dual connectivity scenarios, in accordance with various aspects of the present disclosure.

FIG. 4 is a diagram illustrating an example 400 of sustaining traffic of a first radio access technology (RAT) in power limited dual connectivity scenarios, in accordance with various aspects of the present disclosure.

As shown by reference number 405, a UE 120 and a base station 110 (e.g., an eNB, a gNB, and/or the like) may operate in a dual connectivity mode, such as an ENDC mode. In the dual connectivity mode, communications that use a first RAT (e.g., an LTE RAT, a 4G RAT, and/or the like) may be carried via a master cell group (MCG), and communications that use a second RAT (e.g., an NR RAT, a 5G RAT, and/or the like) may be carried via a secondary cell group (SCG).

As shown by reference number 410, the UE 120 may be in an active communication session that uses the first RAT. The active communication session may include, for example, a voice call (e.g., a VoLTE call), a high priority communication session on the first RAT (e.g., with a priority that satisfies a threshold, one or more quality of service (QoS) parameters that satisfy one or more corresponding thresholds, a QoS class indicator (QCI) value that satisfies a threshold, and/or the like), and/or the like. In some aspects, the UE 120 may determine that the UE 120 is in such an active communication session that uses the first RAT, that a priority associated with the active communication session satisfies a threshold, that the active communication session is a specific type of communication session (e.g., a voice call, a VoLTE call), and/or the like.

As shown by reference number 415, the UE 120 may be configured with a maximum transmit power for the first RAT in the dual connectivity mode (e.g., shown as P-maxEUTRA) that is less than a maximum transmit power threshold. For example, as described above in connection with FIG. 3, in the dual connectivity mode, the overall maximum transmit power of the UE 120 (e.g., P-max and/or the like) may be split between a maximum transmit power for LTE communications for the dual connectivity mode (e.g., P-maxEUTRA) and a maximum transmit power for NR communications for the dual connectivity mode (e.g., P-NR). In some aspects, the values for P-maxEUTRA and P-NR may be indicated to the UE 120 by the base station 110.

In some aspects, the maximum transmit power threshold may be set equal to the overall maximum transmit power of the UE 120 (e.g., based at least in part on a power class of the UE 120). Additionally, or alternatively, the maximum transmit power threshold may be set equal to a maximum transmit power for the UE on the first RAT when not operating in the dual connectivity mode (e.g., which may be represented as P-max). For example, the maximum transmit power threshold may be set to a maximum transmit power of a power class of the UE 120, such as 23 dBm, 26 dBm, and/or the like. In some aspects, the UE 120 may determine that the UE 120 is configured with a maximum transmit power for the first RAT in the dual connectivity mode (e.g., P-maxEUTRA) that is less than the maximum transmit power threshold.

As shown by reference number 420, the UE 120 may determine that one or more power parameters (e.g., a power headroom (PHR) value and/or the like) and/or one or more performance parameters (e.g., an estimated uplink block error rate (BLER)) satisfy a condition. For example, the UE 120 may determine that a PHR value is less than or equal to a threshold (e.g., a first threshold). This may indicate that the UE 120 is in a poor coverage scenario. Additionally, or alternatively, the UE 120 may determine that an estimated uplink BLER is greater than or equal to a threshold (e.g., a second threshold). This may indicate that the UE 120 is in a poor coverage scenario, is experiencing poor performance, is unable to satisfy a BLER target, and/or the like.

As shown by reference number 425, the UE 120 may transmit an indication the secondary cell group has failed. In some aspects, this indication may be transmitted based at least in part on determining that the UE 120 is in the active communication session using the first RAT, based at least in part on determining that the UE 120 is configured with the maximum transmit power that is less than the maximum transmit power threshold, based at least in part on determining that at least one of the PHR value or the estimated BLER satisfies the condition, and/or the like. For example, when the UE 120 is operating in the dual connectivity mode with power split between LTE and NR communications, when the UE 120 determines a low PHR value indicating that the UE 120 is in a poor coverage scenario, when the UE 120 determines a high estimated uplink BLER indicating poor performance, and when the UE 120 determines that there is an active communication session (e.g., a particular type of active communication session, a high priority active communication session, and/or the like) using the first RAT, the UE 120 may indicate SCG failure.

In some aspects, the UE 120 may transmit the indication that the secondary cell group has failed in a secondary cell group failure information message for NR (e.g., an SCGfailureinformationNR message). The UE 120 would normally transmit measurement results (e.g., for NR cells, for the secondary cell group, and/or the like) in the secondary cell group failure information message to permit one or more NR cells to be added to the SCG when parameters of those NR cell(s) (e.g., a reference signal received power (RSRP) parameter, a reference signal received quality (RSRQ) parameter, and/or the like) satisfy a condition. However, to prevent NR cells from being added to the SCG during the active communication session that uses LTE, the UE 120 may refrain from including measurement results for NR cells in the secondary cell group failure information message for NR. Thus, the message carrying the indication that the SCG has failed (e.g., the secondary cell group failure information message for NR) may not include measurement results for the second RAT (e.g., the NR RAT), in some aspects.

Additionally, or alternatively, as described in more detail below in connection with FIG. 5, the UE 120 may refrain from measuring cells of the second RAT and/or may refrain from transmitting results of such measurements to the base station 110 (e.g., until the active communication session is terminated, until the PHR value no longer satisfies the condition, until the estimated uplink BLER no longer satisfies the condition, and/or the like). In this way, resources of the UE 120 and the base station 110 (e.g., memory resources, processing resources, battery power, and/or the like) may be conserved by refraining from making, reporting, or analyzing such measurements. Furthermore, this may prevent cells of the second RAT from being added to the SCG during the active communication session that uses the first RAT, thereby improving performance for the active communication session, permitting an overall maximum transmit power of the UE 120 to be used exclusively for the active communication session, and/or the like.

As a result of indicating such SCG failure, the secondary cell group may be torn down, as shown by reference number 430. This may permit the UE 120 to dedicate full transmit power (e.g., an overall maximum transmit power of the UE 120) to the active communication session using the first RAT, thereby reducing the likelihood that the active communication session is dropped, improving performance, enhancing a user experience, conserving network resources (e.g., by dropping the SCG), conserving UE and base station resources (e.g., memory resources, processing resources, battery power, and/or the like) that would otherwise be used to maintain the SCG, and/or the like.

As indicated above, FIG. 4 is provided as an example. Other examples may differ from what was described with respect to FIG. 4.

Figure 5:
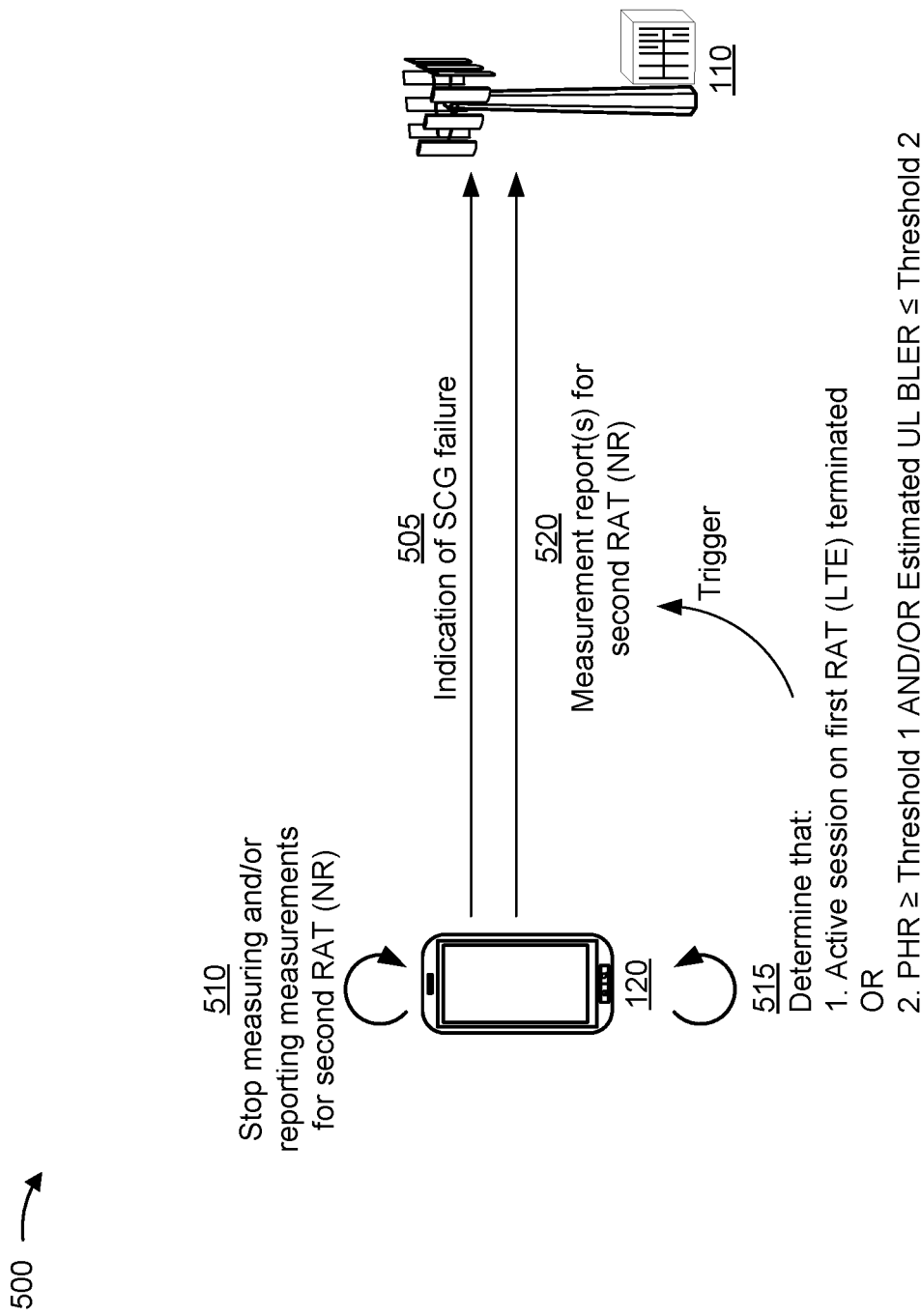

FIG. 5 is a diagram illustrating an example 500 of sustaining traffic of a first radio access technology (RAT) in power limited dual connectivity scenarios, in accordance with various aspects of the present disclosure.

Continuing with the example shown in FIG. 4, and as shown by reference number 505, the UE 120 may transmit an indication the secondary cell group has failed, as described above in connection with FIG. 4.

As shown by reference number 510, the UE 120 may refrain from measuring cells of the second RAT and/or may refrain from reporting measurement results of such measurements (if taken). In some aspects, the UE 120 may refrain from measuring and/or reporting measurements of cells of the second RAT based at least in part on transmitting the indication of the secondary cell group failure. Additionally, or alternatively, the UE 120 may refrain from measuring and/or reporting measurements of cells of the second RAT based at least in part on determining that the UE 120 is in the active communication session using the first RAT, based at least in part on determining that the UE 120 is configured with the maximum transmit power that is less than the maximum transmit power threshold, based at least in part on determining that at least one of the PHR value or the estimated BLER satisfies the condition, and/or the like.

In some aspects, the UE 120 may refrain from measuring cells of the second RAT, and may consequently refrain from reporting measurement results for the second RAT to the base station 110. In this case, resources of the UE 120 may be conserved because the UE 120 need not measure or report measurement results, and resources of the base station 110 may be conserved because the base station 110 need not receive or process such measurement results. Furthermore, network resources may be conserved because such measurements results need not be transmitted.

However, in some aspects, the UE 120 may continue to measure cells of the second RAT, but may refrain from reporting measurement results of such measurements to the base station 110. In this case, network resources and resources of the base station 110 may still be conserved as described above, and resources of the UE 120 associated with transmitting measurement results may also be conserved. In this case, the UE 120 may store measurement results and may have such measurement results ready to transmit to the base station 110 upon determining that the SCG is to be re-established, thereby resulting in quicker re-establishment of the SCG, which may lead to better performance, lower latency, higher throughput, higher reliability, and/or the like.

As shown by reference number 515, the UE 120 may determine that the SCG is to be re-established when one or more conditions are satisfied. For example, the UE 120 may determine that the SCG is to be re-established based at least in part on a determination that the active communication session that uses the first RAT has terminated (e.g., a voice call, a VoLTE call, and/or the like has terminated). In this case, the overall maximum transmit power need not be dedicated to the active communication session that uses the first RAT, so the UE 120 may determine that the SCG can be re-established and that the overall maximum transmit power can be split between communications on the MCG and the SCG. In some aspects, the UE 120 may wait until the expiration of a timer before determining that the SCG is to be re-established, and may determine that the SCG is to be re-established only if another active communication session that uses the first RAT is not established while the timer is running. In some aspects, the timer may begin upon termination of the active communication session. In this way, the UE 120 may avoid re-establishing the SCG when the active communication session was accidentally terminated, was prematurely terminated (e.g., due to poor coverage), and/or the like.

Additionally, or alternatively, the UE 120 may determine that the SCG is to be re-established based at least in part on a determination that that one or more power parameters (e.g., a PHR value and/or the like) and/or one or more performance parameters (e.g., an estimated uplink BLER) no longer satisfy a condition (e.g., a condition described above in connection with FIG. 4) and/or satisfy a different condition. For example, the UE 120 may determine that a PHR value is greater than or equal to a threshold (e.g., the first threshold, or a third threshold that is different from the first threshold). This may indicate that the UE 120 is in a good coverage scenario. Additionally, or alternatively, the UE 120 may determine that an estimated uplink BLER is less than or equal to a threshold (e.g., the second threshold, or a fourth threshold that is different from the second threshold). This may indicate that the UE 120 is in a good coverage scenario, is experiencing good performance, is able to satisfy a BLER target, and/or the like.

As shown by reference number 520, based at least in part on determining that the SCG is to be re-established, the UE 120 may trigger measurement reporting for the second RAT. For example, the UE 120 may resume and/or begin transmission of measurement reports for the second RAT (e.g., reporting of RSRP parameters, reporting of RSRQ parameters, and/or the like for cells of the second RAT). Additionally, or alternatively, if the UE 120 had previously suspended measurements for the second RAT, the UE 120 may resume such measurements to facilitate measurement reporting for the second RAT.

In some aspects, the UE 120 may wait until the expiration of a hysteresis timer before resuming measurements for the second RAT and/or reporting measurement results for the second RAT. In some aspects, the hysteresis timer may begin upon transmission of the indication of SCG failure to the base station 110, upon determination that the indication is to be transmitted, and/or the like. This may prevent early re-establishment of the SCG due to fluctuations in the PHR value, an estimated uplink BLER value, and/or the like.

By re-establishing the SCG after the active communication session has terminated and/or when conditions that resulted in indicated SCG failure have improved (e.g., an improvement to a PHR value, an estimated uplink BLER value, and/or the like), the UE 120 may permit better performance, lower latency, higher throughput, higher reliability, and/or the like.

As indicated above, FIG. 5 is provided as an example. Other examples may differ from what was described with respect to FIG. 5.

FIG. 6 is a diagram illustrating an example process 600 performed, for example, by a UE, in accordance with various aspects of the present disclosure. Example process 600 is an example where a UE (e.g., UE 120 and/or the like) performs operations associated with sustaining traffic of a first radio access technology (RAT) in power limited dual connectivity scenarios.

As shown in FIG. 6, in some aspects, process 600 may include determining that the UE is in an active communication session using a first radio access technology (RAT), wherein the UE is operating in a dual connectivity mode that uses a master cell group for the first RAT and a secondary cell group for a second RAT (block 610). For example, the UE (e.g., using controller/processor 280 and/or the like) may determine that the UE is in an active communication session using a first RAT, as described above. In some aspects, the UE is operating in a dual connectivity mode that uses a master cell group for the first RAT and a secondary cell group for a second RAT.

As shown in FIG. 6, in some aspects, process 600 may include determining that the UE is configured with a maximum transmit power, for the first RAT in the dual connectivity mode, that is less than a maximum transmit power threshold (block 620). For example, the UE (e.g., using controller/processor 280 and/or the like) may determine that the UE is configured with a maximum transmit power, for the first RAT in the dual connectivity mode, that is less than a maximum transmit power threshold, as described above.

As shown in FIG. 6, in some aspects, process 600 may include determining that at least one of a power headroom (PHR) value or an estimated uplink block error rate (BLER) satisfies a condition (block 630). For example, the UE (e.g., using controller/processor 280 and/or the like) may determine that at least one of a PHR value or an estimated uplink BLER satisfies a condition, as described above.

As shown in FIG. 6, in some aspects, process 600 may include transmitting an indication that the secondary cell group has failed based at least in part on determining that the UE is in the active communication session using the first RAT, determining that the UE is configured with the maximum transmit power that is less than the maximum transmit power threshold, and determining that at least one of the PHR value or the estimated BLER satisfies the condition (block 640). For example, the UE (e.g., using controller/processor 280, transmit processor 264, TX MIMO processor 266, MOD 254, antenna 252, and/or the like) may transmit an indication that the secondary cell group has failed based at least in part on determining that the UE is in the active communication session using the first RAT, determining that the UE is configured with the maximum transmit power that is less than the maximum transmit power threshold, and determining that at least one of the PHR value or the estimated BLER satisfies the condition, as described above.

Process 600 may include additional aspects, such as any single aspect or any combination of aspects described below and/or in connection with one or more other processes described elsewhere herein.

In a first aspect, the first RAT is a Long Term Evolution RAT and the second RAT is a New Radio RAT.

In a second aspect, alone or in combination with the first aspect, the maximum transmit power threshold is a maximum transmit power for the UE on the first RAT when not operating in the dual connectivity mode.

In a third aspect, alone or in combination with one or more of the first and second aspects, the maximum transmit power threshold is a maximum transmit power of a power class of the UE.

In a fourth aspect, alone or in combination with one or more of the first through third aspects, determining that at least one of the PHR value or the estimated uplink BLER satisfies the condition comprises at least one of: determining that the PHR value is less than or equal to a first threshold, determining that the estimated uplink BLER is greater than or equal to a second threshold, or a combination thereof.

In a fifth aspect, alone or in combination with one or more of the first through fourth aspects, the indication is transmitted in a secondary cell group failure information message.

In a sixth aspect, alone or in combination with one or more of the first through fifth aspects, the indication does not include measurement results for the second RAT.

In a seventh aspect, alone or in combination with one or more of the first through sixth aspects, process 600 includes refraining from at least one of performing measurements for the second RAT or reporting measurement results for the second RAT based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

In an eighth aspect, alone or in combination with one or more of the first through seventh aspects, process 600 includes determining that at least one of the PHR value or the estimated uplink BLER no longer satisfies the condition; and triggering measurement reporting for the second RAT based at least in part on determining that at least one of the PHR value or the estimated uplink BLER no longer satisfies the condition.

In a ninth aspect, alone or in combination with one or more of the first through eighth aspects, triggering the measurement reporting causes the secondary cell group to be re-established.

In a tenth aspect, alone or in combination with one or more of the first through ninth aspects, determining that at least one of the PHR value or the estimated uplink BLER no longer satisfies the condition comprises: determining that the PHR value is greater than or equal to a first threshold, determining that the estimated uplink BLER is less than or equal to a second threshold, or a combination thereof.

In an eleventh aspect, alone or in combination with one or more of the first through tenth aspects, the UE is configured to trigger measurement reporting for the second RAT based at least in part on a determination that a hysteresis timer has expired.

In a twelfth aspect, alone or in combination with one or more of the first through eleventh aspects, process 600 includes determining that the active communication session has been terminated; and triggering measurement reporting for the second RAT based at least in part on determining that the active communication session has been terminated.

In a thirteenth aspect, alone or in combination with one or more of the first through twelfth aspects, the active communication session includes at least one of: a voice call, a high priority communication session, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that the UE is in an active communication session using a first radio access technology (RAT), wherein the UE is operating in a dual connectivity mode that uses a master cell group for the first RAT and a secondary cell group for a second RAT;
   determining that the UE is configured with a maximum transmit power, for the first RAT in the dual connectivity mode, that is less than a maximum transmit power threshold;
   determining that at least one of a power headroom (PHR) value or an estimated uplink block error rate (BLER) satisfies a condition; and
   transmitting, based at least in part on determining that the UE is in the active communication session using the first RAT, determining that the UE is configured with the maximum transmit power that is less than the maximum transmit power threshold, and determining that at least one of the PHR value or the estimated BLER satisfies the condition, an indication that the secondary cell group has failed.

2. The method of claim 1, wherein the first RAT is a Long Term Evolution RAT and the second RAT is a New Radio RAT.

3. The method of claim 1, wherein the maximum transmit power threshold is a maximum transmit power for the UE on the first RAT when not operating in the dual connectivity mode.

4. The method of claim 1, wherein the maximum transmit power threshold is a maximum transmit power of a power class of the UE.

5. The method of claim 1, wherein determining that at least one of the PHR value or the estimated uplink BLER satisfies the condition comprises at least one of:
determining that the PHR value is less than or equal to a first threshold,
determining that the estimated uplink BLER is greater than or equal to a second threshold, or
a combination thereof.

6. The method of claim 1, wherein the indication is transmitted in a secondary cell group failure information message.

7. The method of claim 1, wherein the indication does not include measurement results for the second RAT.

8. The method of claim 1, further comprising refraining from at least one of performing measurements for the second RAT or reporting measurement results for the second RAT based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

9. The method of claim 1, further comprising:
determining that the active communication session has been terminated; and
triggering measurement reporting for the second RAT based at least in part on determining that the active communication session has been terminated.

10. The method of claim 9, wherein triggering the measurement reporting causes the secondary cell group to be re-established.

11. The method of claim 1, further comprising:
determining that at least one of the PHR value or the estimated uplink BLER no longer satisfies the condition; and
triggering measurement reporting for the second RAT based at least in part on determining that at least one of the PHR value or the estimated uplink BLER no longer satisfies the condition.

12. The method of claim 11, wherein triggering the measurement reporting causes the secondary cell group to be re-established.

13. The method of claim 11, wherein determining that at least one of the PHR value or the estimated uplink BLER no longer satisfies the condition comprises:
determining that the PHR value is greater than or equal to a first threshold,
determining that the estimated uplink BLER is less than or equal to a second threshold, or
a combination thereof.

14. The method of claim 11, wherein the UE is configured to trigger measurement reporting for the second RAT based at least in part on a determination that a hysteresis timer has expired.

15. The method of claim 1, wherein the active communication session includes at least one of:
a voice call,
a high priority communication session, or
a combination thereof.

16. A user equipment (UE) for wireless communication, comprising:
a memory; and
one or more processors operatively coupled to the memory, the one or more processors configured to:
determine that the UE is in an active communication session using a first radio access technology (RAT), wherein the UE is operating in a dual connectivity mode that uses a master cell group for the first RAT and a secondary cell group for a second RAT;
determine that the UE is configured with a maximum transmit power, for the first RAT in the dual connectivity mode, that is less than a maximum transmit power threshold;
determine that at least one of a power headroom (PHR) value or an estimated uplink block error rate (BLER) satisfies a condition; and
transmit, based at least in part on determining that the UE is in the active communication session using the first RAT, determining that the UE is configured with the maximum transmit power that is less than the maximum transmit power threshold, and determining that at least one of the PHR value or the estimated BLER satisfies the condition, an indication that the secondary cell group has failed.

17. The UE of claim 16, wherein the first RAT is a Long Term Evolution RAT and the second RAT is a New Radio RAT.

18. The UE of claim 16, wherein the maximum transmit power threshold is at least one of:
a maximum transmit power for the UE on the first RAT when not operating in the dual connectivity mode, or
a maximum transmit power of a power class of the UE.

19. The UE of claim 16, wherein the one or more processors, when determining that at least one of the PHR value or the estimated uplink BLER satisfies the condition, are configured to at least one of:
determine that the PHR value is less than or equal to a first threshold,
determine that the estimated uplink BLER is greater than or equal to a second threshold, or
a combination thereof.

20. The UE of claim 16, wherein the indication is transmitted in a secondary cell group failure information message.

21. The UE of claim 16, wherein the indication does not include measurement results for the second RAT.

22. The UE of claim 16, wherein the one or more processors are further configured to refrain from at least one of performing measurements for the second RAT or reporting measurement results for the second RAT based at least in part on determining that the UE is in the active communication session using the first RAT, determining that the UE is configured with the maximum transmit power that is less than the maximum transmit power threshold, and determining that at least one of the PHR value or the estimated BLER satisfies the condition.

23. The UE of claim 16, wherein the one or more processors are further configured to:
determine that the active communication session has been terminated; and trigger measurement reporting for the second RAT based at least in part on determining that the active communication session has been terminated.

24. The UE of claim 23, wherein triggering the measurement reporting causes the secondary cell group to be re-established.

25. The UE of claim 16, wherein the one or more processors are further configured to:
determine that at least one of the PHR value or the estimated uplink BLER no longer satisfies the condition; and
trigger measurement reporting for the second RAT based at least in part on determining that at least one of the PHR value or the estimated uplink BLER no longer satisfies the condition.

26. The UE of claim 25, wherein triggering the measurement reporting causes the secondary cell group to be re-established.

27. The UE of claim 25, wherein the one or more processors, when determining that at least one of the PHR value or the estimated uplink BLER no longer satisfies the condition, are configured to:
determine that the PHR value is greater than or equal to a first threshold,
determine that the estimated uplink BLER is less than or equal to a second threshold, or
a combination thereof.

28. The UE of claim 16, wherein the active communication session includes at least one of:
a voice call,
a high priority communication session, or
a combination thereof.

29. A non-transitory computer-readable medium storing one or more instructions for wireless communication, the one or more instructions comprising:
one or more instructions that, when executed by one or more processors of a user equipment (UE), cause the one or more processors to:
determine that the UE is in an active communication session using a first radio access technology (RAT), wherein the UE is operating in a dual connectivity mode that uses a master cell group for the first RAT and a secondary cell group for a second RAT;
determine that the UE is configured with a maximum transmit power, for the first RAT in the dual connectivity mode, that is less than a maximum transmit power threshold;
determine that at least one of a power headroom (PHR) value or an estimated uplink block error rate (BLER) satisfies a condition; and
transmit, based at least in part on determining that the UE is in the active communication session using the first RAT, determining that the UE is configured with the maximum transmit power that is less than the maximum transmit power threshold, and determining that at least one of the PHR value or the estimated BLER satisfies the condition, an indication that the secondary cell group has failed.

30. An apparatus for wireless communication, comprising:
means for determining that the apparatus is in an active communication session using a first radio access technology (RAT), wherein the apparatus is operating in a dual connectivity mode that uses a master cell group for the first RAT and a secondary cell group for a second RAT;
means for determining that the apparatus is configured with a maximum transmit power, for the first RAT in the dual connectivity mode, that is less than a maximum transmit power threshold;
means for determining that at least one of a power headroom (PHR) value or an estimated uplink block error rate (BLER) satisfies a condition; and
means for transmitting, based at least in part on determining that the UE is in the active communication session using the first RAT, determining that the UE is configured with the maximum transmit power that is less than the maximum transmit power threshold, and determining that at least one of the PHR value or the estimated BLER satisfies the condition, an indication that the secondary cell group has failed.

* * * * *